United States Patent

Rice

[11] Patent Number: 5,857,825
[45] Date of Patent: Jan. 12, 1999

[54] TRAILER OPERABLE AS RAMP FOR REAR LOADING TRUCK

[76] Inventor: David H. Rice, 2299 Clinton Ave., Pocatello, Id. 83201

[21] Appl. No.: 782,614

[22] Filed: Jan. 13, 1997

[51] Int. Cl.⁶ ........................................... B60P 1/04
[52] U.S. Cl. ................................................. 414/483
[58] Field of Search .................................. 414/480–485, 414/786

[56] References Cited

U.S. PATENT DOCUMENTS

| | | | |
|---|---|---|---|
| 2,803,362 | 8/1957 | Saenz | 414/480 |
| 3,102,649 | 9/1963 | Whalen | 414/483 |
| 3,786,950 | 1/1974 | Zemier | 414/483 |
| 4,046,274 | 9/1977 | Libersky | 414/485 |
| 4,222,698 | 9/1980 | Boelter | 414/477 |
| 4,630,991 | 12/1986 | Landoll et al. | 414/478 |
| 4,655,671 | 4/1987 | Pratt | 414/477 |
| 4,872,728 | 10/1989 | Adams | 414/483 X |
| 5,137,414 | 8/1992 | Sloan et al. | 414/483 X |
| 5,234,308 | 8/1993 | Mann | 414/480 |
| 5,342,105 | 8/1994 | Miles | 296/61 |
| 5,447,406 | 9/1995 | Voss | 414/430 |
| 5,518,288 | 5/1996 | Deklotz | 296/100 |
| 5,544,944 | 8/1996 | Keech | 414/483 X |

FOREIGN PATENT DOCUMENTS

| | | | |
|---|---|---|---|
| 724808 | 7/1942 | Germany | 414/480 |
| 1119880 | 10/1984 | U.S.S.R. | 414/480 |
| 1671510 | 8/1991 | U.S.S.R. | 414/483 |

*Primary Examiner*—David A. Bucci
*Attorney, Agent, or Firm*—Ken J. Pedersen; Barbara S. Pedersen

[57] ABSTRACT

An articulated vehicle has features that facilitate loading and unloading. The vehicle includes a truck and a trailer. The truck is loaded from the rear, as in the case of a pickup truck with an endgate or tailgate. The trailer is coupled to the truck by a tongue on the undercarriage of the trailer. The trailer includes a bed and a front section. The bed, when released from the tongue pivots toward the ground so that a load can be rolled from the ground onto the bed. The front section is hinged to the bed. When the front section is unlocked from an upright position, it extends over the tongue to be supported in part by the tailgate. A hinged riser on the tongue supports the bed and the section as the load is rolled from the bed into the truck. When unloading, the bed tips toward the ground as the load is rolled off the bed. The articulated vehicle loads and unloads without a separate ramp, dock, or tailgate lift.

3 Claims, 3 Drawing Sheets

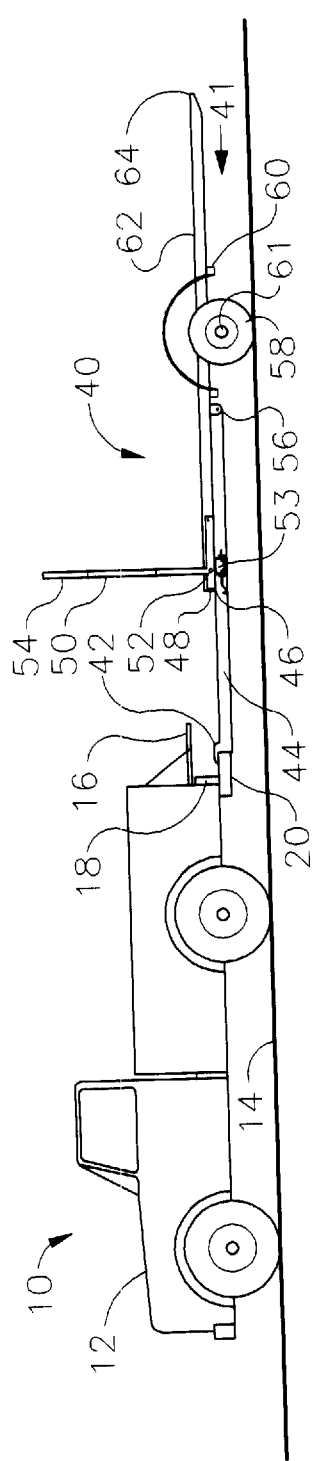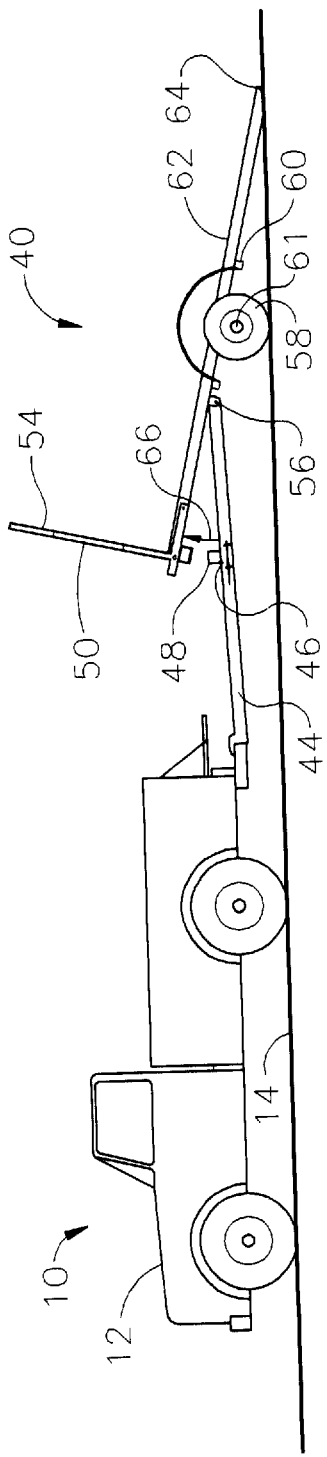

TRAILER OPERABLE AS RAMP FOR REAR LOADING TRUCK

DESCRIPTION

FIELD OF THE INVENTION

This invention relates to articulated vehicles and to methods for loading and unloading articulated vehicles.

BACKGROUND

As an introduction to the problems solved by the present invention, consider the conventional articulated vehicle consisting of a conventional pickup truck and a conventional flat bed trailer. Loading and unloading such a vehicle ordinarily involves first loading the truck apart from the trailer. Conventional methods of loading the truck include (a) lifting articles onto the truck bed, endgate, or tailgate, (b) outfitting the truck with an endgate lift and using the lift to transfer articles to the truck bed, (c) providing a dock having a height matching the height of the truck bed and rolling articles from the dock to the truck bed, and (d) providing a ramp and rolling articles up the ramp. After the truck bed is loaded, the trailer is coupled to the truck. Although the flat bed trailer is nearer ground level than the truck bed, methods similar to the aforementioned methods of loading the truck bed are then performed to load the trailer.

The above methods are fraught with difficulty and safety hazards, especially when performed by a do-it-yourselfer or laborer for a small business. Few do-it-yourselfers' residences provide a dock for loading, yet heavy articles are so often shipped to and from residences for installation, off-site maintenance, and recreation that many do-it-yourselfers own a pickup truck. Endgate lifts are considered by most to be bulky and prohibitively expensive for occasional and recreational uses. Many small businesses operate from facilities similar to or formerly used as residences. Though strenuous lifting of articles to be loaded can be avoided with ramps, heavy lifting is involved to deploy, position, and stow such ramps. Ramps sufficient to load a pickup truck are often too steep for safe handling of cumbersome equipment including recreational all-terrain vehicles, riding lawn mowers, business machines, major appliances on hand trucks, and the like.

Without safe and convenient means for loading an articulated vehicle, equipment is exposed to the possibility of serious damage; and personnel are exposed to the possibility of serious injury. The expense in labor and special facilities including lifts, docks, and ramps precludes efficient transport of freight, consequently decreasing the enjoyment of modern residential life, and increasing the cost of doing business.

In view of the problems described above and related problems that consequently become apparent to those skilled in the applicable arts, the need remains in freight hauling for an articulated vehicle that is safely and conveniently loaded from the rear.

SUMMARY OF THE INVENTION

Accordingly, an articulated vehicle in one embodiment of the present invention includes a truck and a trailer. The truck is loadable from the rear. The trailer includes an undercarriage, a tongue, a bed pivoted on the undercarriage, and a section hinged to the bed. The tongue couples the truck to the undercarriage. The bed has a front end and a rear end. When the bed pivots on the undercarriage, the rear end moves toward the ground so that a provided load can be rolled from the ground onto the trailer. The section pivots on the bed near the front end. The section supports the provided load that rolls from the trailer onto the truck.

According to a first aspect of such an embodiment, the truck is loadable with the trailer attached to it. The difficulty of coupling a loaded truck to a trailer is avoided.

According to another aspect, a provided load is loaded or unloaded without heavy lifting, rolled from the surface on which the vehicle is standing onto the trailer and then onto the truck in one uninterrupted operation. By rolling the load onto the trailer and truck, heavy lifting is avoided, thereby decreasing the risk of equipment damage and personal injury.

According to yet another aspect, the truck and the trailer are each loaded by repeated use of one technique—rolling each load from the ground surface onto the articulated vehicle. By loading with one technique, loading is faster, more efficient, safer.

According to still another aspect, no accessory equipment is needed at the loading area or the unloading area for wheeled loads. Therefore, accessory equipment such as ramps, docks, and lifts need not be provided nor carried as part of the load. Vehicles without built-in ramps or lifts can be used in the articulated vehicle of the present invention. And, loading and unloading are less likely to be interrupted for lack of proper equipment.

According to a further aspect, the section moves on a hinge to be stowed out of the way when the articulated vehicle is to be moved. The turning radius of the articulated vehicle is therefore not unduly compromised by the trailer.

Another embodiment of the present invention includes a riser between the tongue and the bed. The riser supports the bed at an angle to the tongue.

According to a first aspect of such an embodiment, the bed remains level when the tongue rests on the surface on which the trailer stands. A load on the trailer is thereby stored in a level orientation.

According to another aspect, the riser prevents the hinged joint between the bed and the section from entering a stable orientation wherein rolling a load between the section and the bed would become abruptly difficult or unsafe.

The present invention may be practiced according to a method for loading an articulated vehicle in one embodiment which includes the steps of allowing the rear end of the trailer to tilt toward the ground, rolling a load onto the bed of the trailer, and moving a section of the trailer toward the truck, and rolling the load across the section and onto the truck.

According to a first aspect of such a method, multiple wheeled loads can be transported without additional equipment. For example, multiple golf carts, multiple all-terrain vehicles, or multiple pieces of earthmoving equipment are loaded and transported safely and efficiently.

According to a second aspect, an articulated vehicle of the present invention including a dump truck is loaded according to such a method. The otherwise unused space in the dump truck is used for transporting additional earthmoving equipment.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 1 is a side view of an articulated vehicle in one embodiment of the present invention in a position for transportation.

FIG. 2 is a side view of the articulated vehicle shown in FIG. 1 in a position for loading the trailer.

Figure 3:
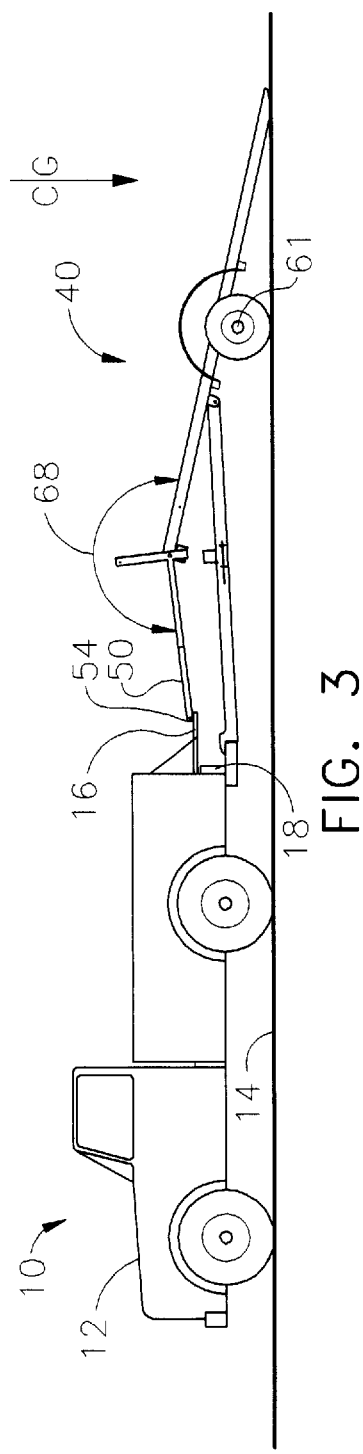
FIG. 3 is a side view of an articulated vehicle shown in FIG. 1 in a first position for transferring a load between the trailer and the truck.

A person having ordinary skill in the art will recognize where portions of a diagram have been expanded to improve the clarity of the presentation.

DESCRIPTION OF THE PREFERRED EMBODIMENTS

FIG. 1 is a side view of an articulated vehicle in one embodiment of the present invention in a position for transportation. Articulated vehicle 10 includes truck 12 coupled to trailer 40. Truck 12 is a conventional rear-loadable truck operated on ground surface 14. Truck 12 includes truck bed 16, step 18, and hitch receiver 20. As illustrated step 18 serves as a bumper supporting hitch receiver 20. In alternate embodiments, a bumper is used in addition to step 18 and an alternate conventional receiver is mounted under the bumper. Alternates for truck 12 include a tail gate or endgate at or above step 18. An endgate or tail gate, when used, serves to extend truck bed 16, providing additional support for a load during loading and unloading or during transport.

Alternate trucks include, but are not limited to, a conventional pickup truck, delivery van, and dump truck, to name a few general purpose types of trucks. Special purpose trucks, such as a moving van, a flat bed, an auto carrier, a boat carrier, etc., are used in alternate embodiments according to the principles described below with respect to the illustrated embodiment.

Trailer 40 is of conventional welded steel construction. Trailer 40 includes undercarriage 41, tongue 44, bed 62, and section 50.

Undercarriage 41 includes an axle 61, a pair of wheels 58, a suspension system 60, and a pivot 56. The near side wheel of the pair of wheels 58 is not shown in FIGS. 1 through 4 so that suspension system 60 is visible. Axle 61, wheels, 58, and suspension system 60 as illustrated are of conventional design for light weight freight hauling. An alternate embodiment includes a two axle undercarriage that additionally includes a second pivot operative to allow bed 62 to pivot on an axis through the second pivot. In the embodiment shown, bed 62 pivots on the central horizontal axis of axle 61.

Tongue 44 includes hitch cup 42, and riser 48. Tongue 44 couples undercarriage 41 to truck 12. Tongue 44 attaches to undercarriage 41 at pivot 56 to be described in greater detail with reference to FIG. 5 below.

Riser 48 is attached to tongue 44 at hinge 46 and pivots between two positions. In a first position shown in FIG. 1, riser 48 is stowed forward of bed 62. In a second position shown in FIGS. 2 through 5, riser 48 is turned upright on hinge 46 to provide support directly under the front end of bed 62 as will be described in greater detail with reference to FIG. 5 below.

The surface of bed 62 in the preferred embodiment is constructed of expanded metal grating for light weight, strength, and drainage. When trailer 40 is to be used exclusively for wheeled vehicles such as motorcycles, all-terrain vehicles, or golf carts, for example, or for tracked vehicles such as snow mobiles, skidders, earthmoving equipment, or armament for example, the surface of bed 62 includes wheel or track alignment channels instead of, or in addition to, the grating. In alternate embodiments, grating, planking, or channels are used in any permanent or temporary combination that facilitates handling particular loads.

Figure 4:
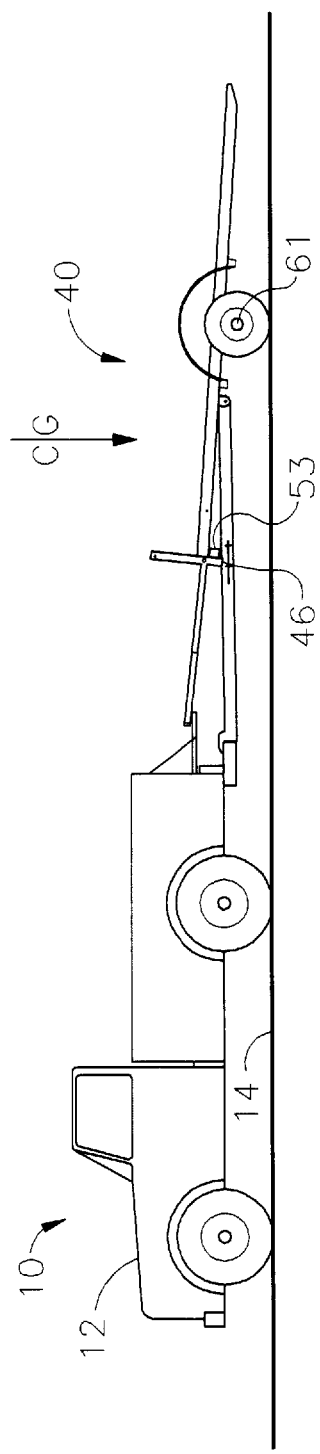
FIG. 4 is a side view of an articulated vehicle shown in FIG. 1 in a second position for transferring a load between the trailer and the truck.

Section 50 is attached to bed 62 at hinge 52. Section 50 includes telescoping extensions 54 shown nested and stowed in FIG. 1 and shown extended in FIGS. 2 through 4. Section 50 provides a surface used as a ramp as shown in FIGS. 2 through 4. The surface of section 50 is identical to any of the surfaces described for bed 62, above. In an alternate embodiment, section 50 includes a hinged subsection pivoted on a horizontal axis. By moving the subsection about the axis 180 degrees, section 50 serves as either a fully closed barrier against which a load may be tethered, or as a clear passage for a load that must extend forward of hinge 52 to be conveniently or safely transported.

In yet another embodiment, particularly suited for use with heavy equipment, section 50 is formed of one or more supports or ramps hinged at 52, one ramp or support for each wheel track needed to transfer particular loads from trailer 40 to truck 12. For instance, two ramps hinged independently at 52 would suffice to support a conventional hand truck over tongue 44. Multiple supports are used in an alternate embodiment wherein a removable floor section is extended over the supports after the supports are deployed. Floor sections of any conventional material are extended by conventional means including unrolling, unfolding, and telescoping, to name a few.

FIG. 2 is a side view of the articulated vehicle shown in FIG. 1 in a position for loading the trailer. The illustrated position is obtained by releasing bed 62 from tongue 44 at tabs 53 and then lifting the front end of bed 62, for example at hinge 52, and/or lowering rear end 64 to a stable position resting on or near to ground surface 14. The dimensions and materials of trailer 40 are selected by conventional design techniques to provide a particular center of gravity of trailer 40 with section 50 upright. Because the center of gravity of trailer 40, positioned as shown in FIG. 2, is provided directly over or nearly over axle 61, little effort is required of a user to pivot bed 62 on the central axis of axle 61. A load may then be rolled onto trailer 40 from ground surface 14. As the load passes over axle 61, bed 62 returns to the position shown in FIG. 1, level with ground surface 14.

FIG. 3 is a side view of an articulated vehicle shown in FIG. 1 in a first position for transferring a load between the trailer and the truck. The illustrated position is obtained by deploying telescoping extensions 54 and then moving section 50 about hinge 52 until extensions 54 rest on bed 16 of truck 12. While the center of gravity of trailer 40 (and load, if any, moved onto trailer 40) remains rearward of axle 61, rear end 64 will remain on or near ground surface 14. As the load is moved or distributed toward or onto truck bed 16, the center of gravity moves as shown in FIG. 4. Consequently, rear end 64 raises from ground surface 14 and front end 52 descends to rest on riser 48.

FIG. 4 is a side view of an articulated vehicle shown in FIG. 1 in a second position for transferring a load between the trailer and the truck. The illustrated position is obtained during loading, as discussed above with reference to FIG. 3; or during unloading, when trailer 40 is unloaded, prior to unloading truck 12. The dimensions and materials of trailer 40, in a preferred embodiment are selected by conventional technique to permit the average adult user's weight when walking between ground surface 14, bed 62, and truck bed 16 to affect the change of positions illustrated in FIGS. 1 through 4.

Figure 5:
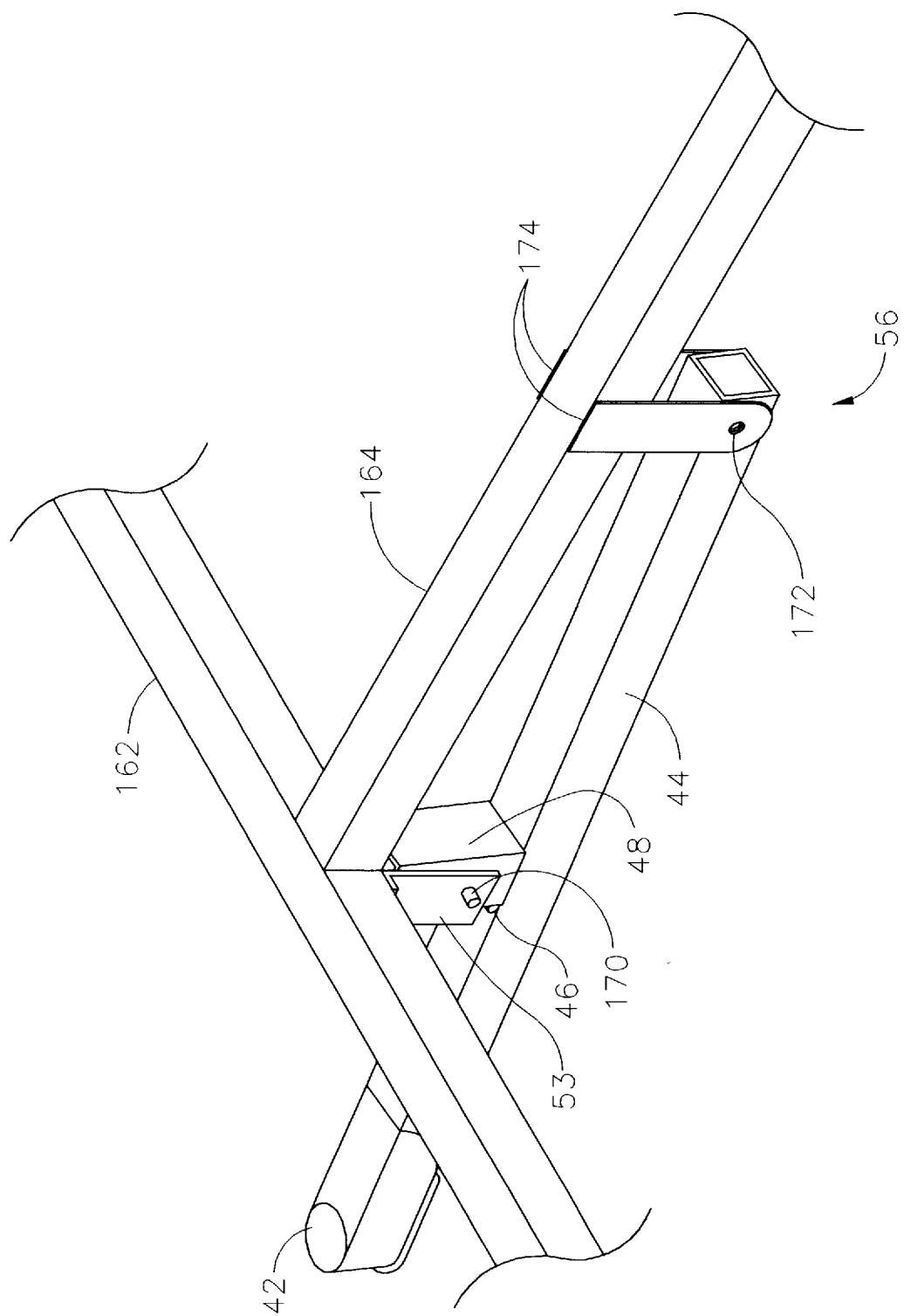
FIG. 5 is a perspective view of a portion of the tongue and bed of the trailer shown in FIG. 1.

FIG. 5 is a perspective view of a portion of the tongue and bed of the trailer shown in FIG. 1. Riser 48 is attached to tongue 44 at hinge 46. As shown, riser 48 is in its upright position under structural members 162 and 164 of bed 62. Pin 170 is used to lock tabs 53 about the outside surfaces of riser 48, thereby fixing acute angle 66, for example, to maintain bed 62 level when tongue 44 is uncoupled from truck 12 and is resting on ground surface 14. When pin 170 is removed, structural members 162 and 164 are free to pivot away from riser 48. When riser 48 is stowed against tongue 44, pin 170 is used to lock tabs 53 about tongue 44, for example during movement of articulated vehicle 10.

Tabs 174 extend downward from structural member 164. Pivot 56 between tongue 44 and bed 62 is formed by pin 172 through tabs 174 and tongue 44.

A method, in one embodiment, for loading an articulated vehicle includes the steps of:

a. leveling bed 62 on tongue 44 by relocating pin 170 and stowing riser 48;
b. coupling trailer 40 to truck 12;
c. releasing bed 62 from tongue 44 by relocating pin 170, deploying riser 48, and allowing rear end 64 to tilt toward ground surface 14;
d. deploying section 50 by extending telescoping extensions 54 and moving section 50 about the axis of hinge 52 toward truck bed 16;
e. rolling a load onto bed 62;
f. rolling the load across section 50 and onto truck 12;
g. stowing section 50 by returning it to an upright position with respect to bed 62 as illustrated in FIG. 1 and locking it in position by conventional means including for example a hasp or latch;
h. rolling an additional load onto bed 62; and
i. stowing riser 48 by lifting bed 62 at the front end and repositioning pin 170, thereby locking bed 62 to tongue 44.

A method, in one embodiment, for unloading an articulated vehicle, includes the steps of:

a. releasing bed 62 from tongue 44 and deploying riser 48;
b. deploying section 50 by deploying extensions 54 and moving section 50 about the axis of hinge 52 so that extensions 54 rest on or near truck bed 16;
c. rolling a load from bed 62 onto ground surface 14;
d. rolling an additional load from truck bed 16 across section 50, onto bed 62; and
e. allowing bed 62 to tilt toward ground surface 14 as the additional load is rolled from bed 62 to ground surface 14.

The foregoing description discusses preferred embodiments of the present invention, which may be changed or modified without departing from the scope of the present invention. For example, various differences in dimensions of bed 62, section 50, extensions 54, tongue 44, and the height of riser 48 are made in alternate embodiments to account for standard heights of available undercarriages 41 and to match trailer 40 to the height of bed 16 in one or more trucks to be used therewith. Extensions 54 in alternate embodiments are eliminated or supplemented by conventional means to account for the presence or absence of extensions of bed 16 provided for example by an endgate, a tail gate, or a tail gate lift. Such design choices are made in alternate embodiments to maintain the angle 68 as close to 180 degrees as possible for use of trailer 40 with a wide variety of trucks and loads.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and by practice of the invention to one of ordinary skill in the art to which the invention applies.

I claim:

1. A trailer operable on a ground surface for carrying a load and for loading a truck, the trailer comprising:

an undercarriage comprising a tongue, an axle, and wheels on the axle, the axle having a central axis; and
a bed having a front end and a rear end, the bed being supported by the undercarriage, being pivotable forward on the central axis of the wheel axle to a first position wherein the front end is near the tongue, and being pivotable rearward on said central axis to a second position wherein the rear end of the bed contacts the ground surface;
wherein the tongue is pivotally connected to the bed between the wheel axle and the front end of the bed; and
wherein the trailer further comprises a section pivotally connected to the bed near the front end and above the tongue, wherein the section is adapted to pivot upward into an upright orientation with respect to the bed to provide a barrier for retaining a load on the bed and to pivot forward toward the tongue to contact a truck rear end and provide a ramp over the tongue for loading the truck and wherein the trailer further comprises a riser extending upward from the tongue, and wherein the riser does not touch the bed when the bed is pivoted rearward to the second position, the riser being pivotally attached to the tongue, so that the riser is pivotal down to a lowered position and pivotal upward to a raised position underneath the front end of the bed.

2. A trailer as in claim 1, wherein the trailer, when unloaded, has a center of gravity above or rearward of the wheel axle, and wherein, when the bed is unlocked from the tongue, the bed pivots rearward into said second position, and wherein the bed, when loaded so that the loaded trailer center of gravity is forward of the wheel axle, pivots forward to contact, and be supported by, the riser upending from the tongue.

3. An articulated vehicle driven on and loaded from a ground surface, the vehicle comprising:

a. a rear-loadable truck having a rear end; and
b. a trailer comprising:
(1) an undercarriage having wheels and a wheel axle;

(2) a tongue that mechanically couples the truck rear end to the undercarriage;

(3) a bed pivotally connected to the undercarriage near the wheels and having a front end and a rear end, wherein the bed pivots rearward to move the rear end toward the ground surface and to support a provided load that rolls onto the trailer from the ground surface, and wherein the bed pivots forward as the provided load rolls forward toward the bed front end; and (4) a section pivotally connected to the bed near the front end and constructed to pivot forward to contact and be supported by the truck rear end, wherein the section supports the provided load that rolls onto the truck from the trailer;

wherein the tongue is pivotally connected to the bed between the front end of the bed and the wheel axle; and wherein the trailer comprises a riser extending up from the tongue, wherein the riser does not contact the bed when the bed is pivoted rearward to place the bed rear end in contact with the ground; and wherein the riser is pivotally connected to the tongue, so that the riser is pivotal down to a lowered position and pivotal upward to a raised position underneath the front end of the bed.

\* \* \* \* \*